United States Patent
Ruszczyk et al.

(10) Patent No.: US 11,999,267 B2
(45) Date of Patent: Jun. 4, 2024

(54) POWER LINE SYSTEM WITH RIPPLE GENERATOR FOR ELECTRIC VEHICLES

(71) Applicant: ABB Schweiz AG, Baden (CH)

(72) Inventors: Adam Ruszczyk, Lesser Poland Voivodeship (PL); Rafal Jackowicz, Cracow (PL); Nicolae Stefan Preda, Cracow (PL)

(73) Assignee: ABB Schweiz AG, Baden (CH)

( * ) Notice: Subject to any disclaimer, the term of this patent is extended or adjusted under 35 U.S.C. 154(b) by 718 days.

(21) Appl. No.: 17/153,226

(22) Filed: Jan. 20, 2021

(65) Prior Publication Data

US 2022/0227258 A1    Jul. 21, 2022

(51) Int. Cl.
  *B60M 7/00*   (2006.01)
  *B60L 50/30*  (2019.01)
  *B60L 53/10*  (2019.01)

(52) U.S. Cl.
  CPC .......... *B60M 7/003* (2013.01); *B60L 50/30* (2019.02); *B60L 53/11* (2019.02); *B60L 2200/26* (2013.01)

(58) Field of Classification Search
  CPC ......... B60M 7/003; B60M 3/06; B60L 50/30; B60L 53/11; B60L 2200/26; B60L 9/00; B60L 7/22
  See application file for complete search history.

(56) References Cited

U.S. PATENT DOCUMENTS

| | | | |
|---|---|---|---|
| 6,377,877 B1 * | 4/2002 | Doner | B61L 27/57 701/19 |
| 6,587,738 B1 * | 7/2003 | Belcea | G06Q 10/047 700/36 |
| 10,894,552 B2 * | 1/2021 | Brooks | B61L 27/40 |
| 11,034,261 B2 * | 6/2021 | Landreth | B60L 5/18 |
| 2004/0000888 A1 | 1/2004 | Shimada et al. | |
| 2005/0279242 A1 * | 12/2005 | Maier | B60L 50/30 105/26.05 |
| 2007/0219681 A1 * | 9/2007 | Kumar | B61L 25/021 701/19 |

(Continued)

FOREIGN PATENT DOCUMENTS

JP     2014-129001 A    7/2014

OTHER PUBLICATIONS

European Patent Office, International Search Report in International Patent Application No. PCT/IB2022/050474, 5 pp. (dated May 19, 2022).

(Continued)

*Primary Examiner* — Mussa A Shaawat
(74) *Attorney, Agent, or Firm* — Leydig, Voit & Mayer, Ltd.

(57) ABSTRACT

A power line system is provided for efficiently using excess electrical energy produced by electric vehicles in a generation mode. A power line detector on the vehicle senses the power line to determine if voltage ripples are present before supplying excess electrical energy from the vehicle to the power line. First voltage ripples are generated on the line by a substation providing power to the power line. Second voltage ripples are also generated on the power line by a ripple generator to allow excess energy from the vehicle to be supplied to the power line in order to charge an energy storage system.

20 Claims, 4 Drawing Sheets

(56) References Cited

U.S. PATENT DOCUMENTS

| | | | |
|---|---|---|---|
| 2008/0021602 A1* | 1/2008 | Kingham | B60L 7/14 701/19 |
| 2009/0187291 A1* | 7/2009 | Daum | B61L 3/006 701/19 |
| 2010/0039067 A1* | 2/2010 | Hill | B60L 53/30 320/109 |
| 2011/0210867 A1* | 9/2011 | Benedikt | G08G 1/01 340/905 |
| 2012/0013181 A1 | 1/2012 | Kim et al. | |
| 2012/0086369 A1 | 4/2012 | Kitanaka et al. | |
| 2012/0277940 A1* | 11/2012 | Kumar | B61L 27/16 701/19 |
| 2013/0144670 A1* | 6/2013 | Kickbusch | G06Q 10/06 705/7.12 |
| 2013/0171590 A1* | 7/2013 | Kumar | G09B 19/167 434/62 |
| 2014/0232191 A1 | 8/2014 | Doelling et al. | |
| 2014/0277861 A1* | 9/2014 | Raghunathan | B61L 27/16 701/19 |
| 2015/0032302 A1 | 1/2015 | Foerster et al. | |
| 2015/0094884 A1* | 4/2015 | Matsumura | B60L 3/0069 701/19 |
| 2015/0191086 A1 | 7/2015 | Sugahara et al. | |
| 2015/0343906 A1 | 12/2015 | Hatanaka et al. | |
| 2015/0353109 A1 | 12/2015 | Foerster et al. | |
| 2016/0114701 A1* | 4/2016 | Heinen | B60M 7/003 191/2 |
| 2017/0305300 A1 | 10/2017 | Katsumata et al. | |
| 2018/0208063 A1 | 7/2018 | Zheng et al. | |
| 2018/0222500 A1 | 8/2018 | Voyer | |
| 2018/0345822 A1* | 12/2018 | Song | B60L 9/24 |
| 2020/0207376 A1* | 7/2020 | Schuhholz | B60L 50/53 |
| 2020/0207377 A1* | 7/2020 | Schuhholz | B60M 7/003 |
| 2020/0235579 A1 | 7/2020 | Sorffker et al. | |

OTHER PUBLICATIONS

European Patent Office, Written Opinion in International Patent Application No. PCT/IB2022/050474, 6 pp. (dated May 19, 2022).

* cited by examiner

POWER LINE SYSTEM WITH RIPPLE GENERATOR FOR ELECTRIC VEHICLES

BACKGROUND

The present inventions relate generally to electric trams, metros, trains and the like, and more particularly, to a power line system for supplying electric power to electric vehicles connected to the power line.

Electric trams, metros, trains and the like use a power line that extends along a travel length and provides power to the electric vehicles as they move along the power line. That is, the power line remains electrically charged along the length of the power line, and the electric vehicles draw power from the power line as the electric vehicles travel by staying connected to the power line along the travel length. The power line may be an overhead line (also referred to as a catenary line) that the electric vehicle follows or may run along the ground parallel to the rails upon which the vehicle travels. Typically, such power systems supply DC power to the electric vehicles. In such an arrangement, the power line may have a DC positive line and a DC negative line. Commonly, the overhead power line or separate line along the ground will be the DC positive line, while the rails upon which the vehicle's wheels travel may be the DC negative line.

In electric vehicle systems described above, it is preferable for the electric vehicles to be able to recover energy which would otherwise be lost during braking events. In traditional vehicle systems, mechanical brakes may be used to slow the speed of an electric vehicle, but these systems are inefficient due to the lost energy that occurs during braking events. Mechanical brakes also require time consuming maintenance and create undesirable pollution during use. Although it is known in some vehicle systems that regenerative braking may be used to increase efficiency by slowing the vehicle with an electric generator that produces electricity during braking events, it has been difficult to incorporate regenerative braking into power line systems like those described above.

SUMMARY

A power line system is described for electric vehicles, such as electric trams, metros, trains and the like. The system includes a power line extending along a length that provides electric power to the vehicle as it travels along the length. A substation provides power to the power line with first voltage ripples that are detectable by the vehicle. A ripple generator also generates second voltage ripples on the power line. An energy storage system is also connected to the power line. The vehicles are able to operate in an energy recuperation mode when either the first or second voltage ripples are detected by the vehicle. During the energy recuperation mode, excess electricity produced by the vehicle is provided to the power line which may be stored by the energy storage system. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
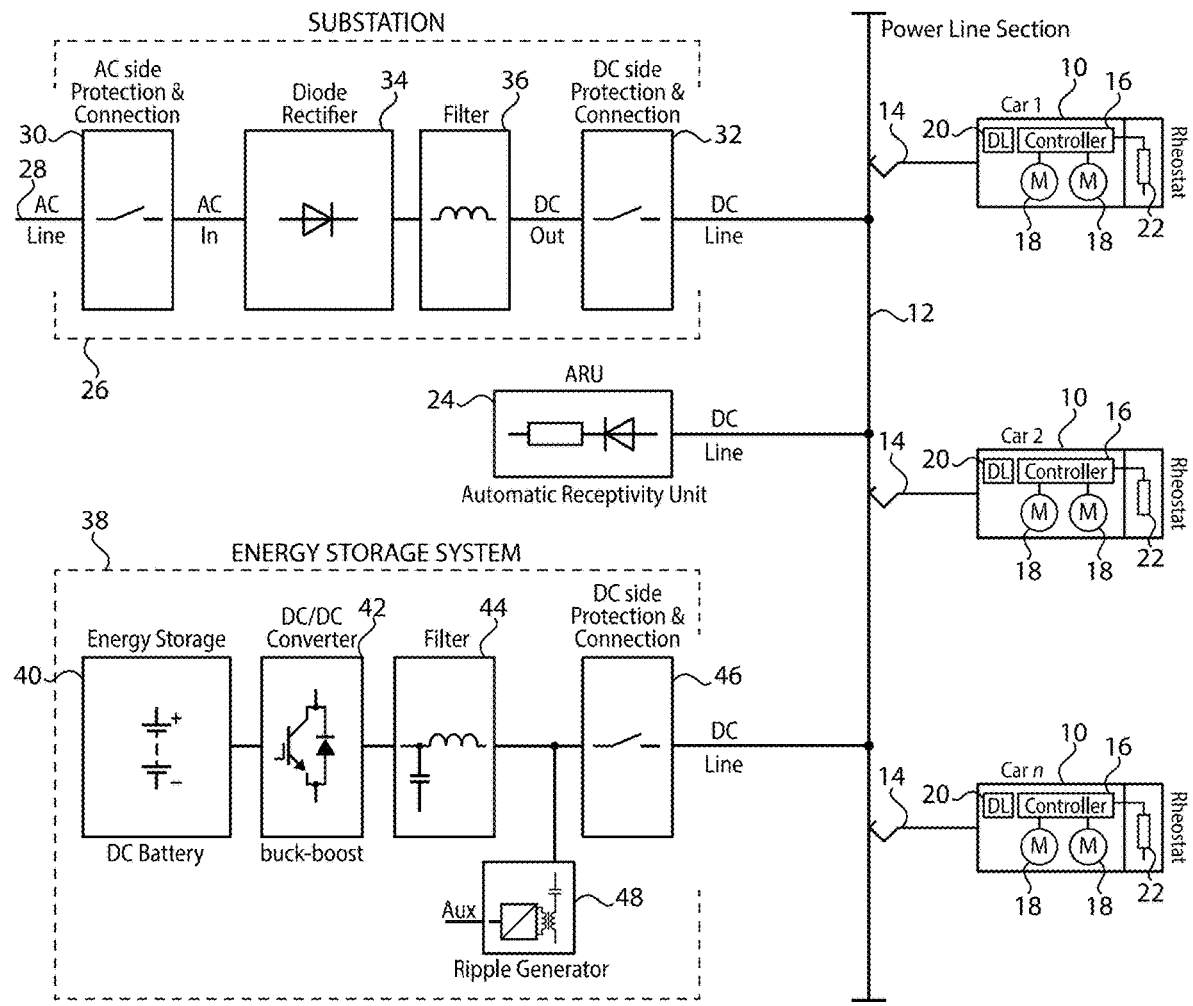
FIG. 1 is a schematic of a power line system for electric vehicles.

Referring now to the figures, and particularly FIG. 1, a power line system for electric vehicles 10 is shown. In the system, the electric vehicles 10 are electrically connected to the power line 12 with a connector 14 that slides or runs along the power line 12 as the vehicle 10 travels. Each vehicle 10 has a controller 16 that controls the motors 18 that drive the wheels of the vehicle 10. The controller 16 allows the motors 18 to operate in a drive mode where the vehicle 10 draws power from the power line 12 to drive the electric vehicle 10. Alternatively, the controller 16 allows the motors 18 to operate in a generation mode in which the motors 18 produce electricity during a braking event. A power line detector 20, or dead-line detector 20, is also provided on the electric vehicle 10 to sense electric properties of the power line 12. As described further below, the detector 20 may control whether electricity produced by the motors 18 during the generation mode (e.g., during a braking event) is supplied to the power line 12 in an energy recuperation mode or whether it is dissipated on the electric vehicle 10 by a rheostat 22, or electric energy dissipater 22. An automatic receptivity unit (ARU) 24 may also be connected to the power line 12. That ARU 24 functions like the rheostats 22 on the vehicles 10 but has significantly greater capability to dissipate electric energy from the power line 12.

A substation 26 is also connected to the power line 12 to supply electric power to the line 12. Typically, the power supplied to the substation 26 will be AC power provided by an AC power grid 28, and the power supplied from the substation 26 to the power line 12 will be DC power. Preferably, the substation 26 has an input control switch 30 and an output control switch 32, which may be circuit breakers 30, 32 used for electrical protection and maintenance. Typically, the substation 26 includes a diode rectifier 34 that converts the AC power supply from the AC grid 28 to DC power to be supplied to the power line 12. A filter 36 may also be provided after the diode rectifier 34.

An energy storage system 38 may also be connected to the power line 12. The energy storage system 38 may include a DC battery 40 for electrical energy storage. The energy storage 40 may be used to absorb excess energy from the power line 12 to charge the battery 40 and may supply electric power to the power line 12 when needed or desirable. The energy storage system 38 may also include a DC/DC converter 42 connected to the battery 40 and a filter 44 connected to the converter 42. A control switch 46, such as a circuit breaker 46 for electric protection and maintenance, may also be provided at the connection between energy storage system 38 and the power line 12.

A ripple generator 48 may also be connected to the power line 12. In the embodiment of FIG. 1, the ripple generator 48 may be a part of the energy storage system 38 and may be connected between energy storage 40 and the power line 12, and more preferably between the filter 44 and the circuit breaker 46. As described further below, the ripple generator 48 generates electrical ripples on the power line 12 which can be sensed by the power line detectors 20 on the electric vehicles 10.

Figure 3:
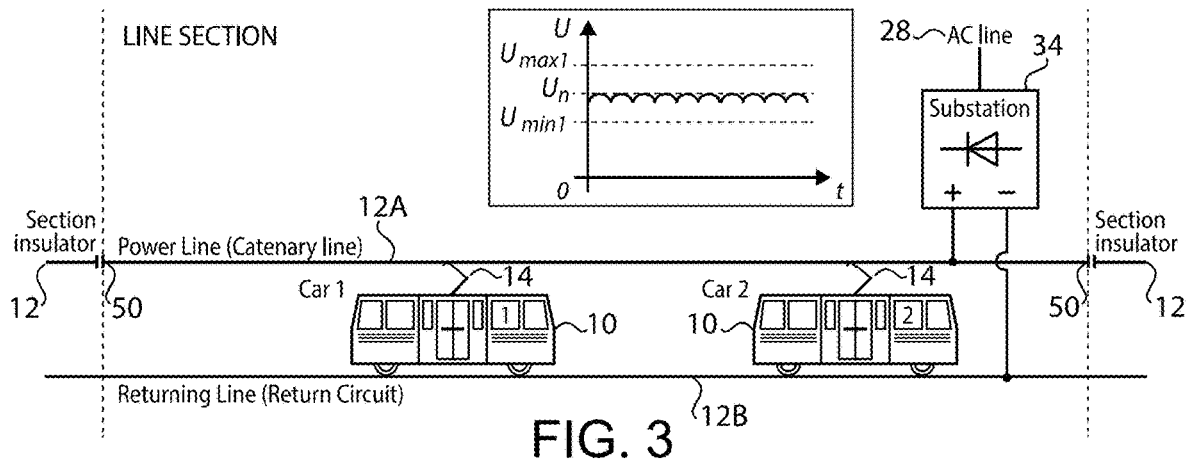
FIG. 3 is schematic of a standby state of the power line system.

Although the length of the power line 12 may vary greatly, the travel length of the power line 12 will typically be within a range of ½ km to 30 km. This does not mean that the electric vehicles 10 are limited to this length for overall travel purposes. As shown in FIG. 3, it may be possible to connect multiple power line systems together with section insulators 50 that allow vehicles 10 to cross over to other power line systems and potentially travel unlimited lengths with such a system. In some embodiments, it may be desirable for the substation 26 to be located in the middle 40% of the power line 12 length. This allows the power line 12 to extend as far as possible in each direction while keeping the voltage levels at the extremities above the minimum voltage necessary for proper operation. It may also be desirable in some embodiments to separate the substation 26 from the energy storage system 38 by a distance to allow the energy storage system 38 to provide voltage stabilization at distances away from the substation 26. For example, it may be desirable to separate the substation 26 and the energy storage system 38 from each other by a distance of at least 30% of the travel length of the power line 12.

Figure 2:
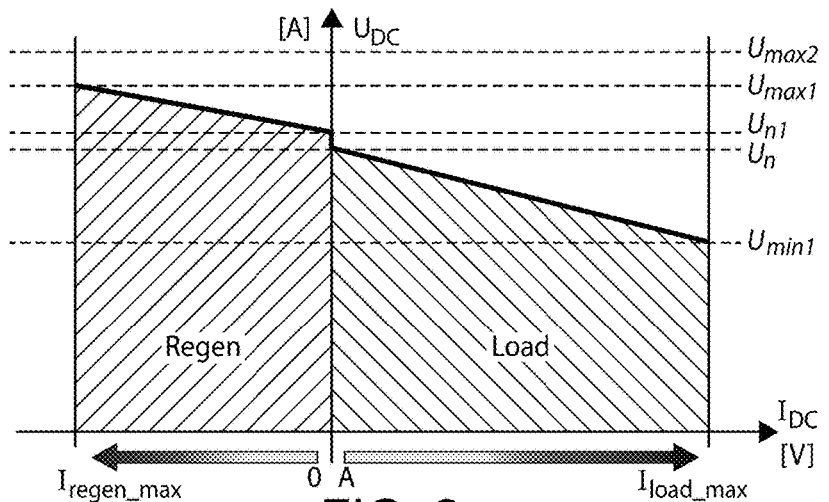
FIG. 2 is a chart of voltages on the power line of the power line system.

FIG. 2 illustrates voltage ranges that the power line 12 may experience during operation. Preferably, the voltages on the power line 12 satisfy standards set for railway applications, such as EN 50163 set by the European Committee for Standards. Although various standards or non-standard embodiments may be used, the described embodiment may be particularly suitable for 750 V DC traction systems, e.g., according to EN 50163. In the Figures, $U_{max2}$ represents the highest non-permanent (e.g., max of 5 min.) voltage (e.g., 1,000 V). $U_{max1}$ represents the highest permanent voltage (e.g., 900 V). If the voltage exceeds $U_{max1}$, the ARU 24 and/or vehicle rheostats 22 may dissipate the excess energy. $U_{n1}$ represents the regeneration mode threshold voltage. Although $U_{n1}$ ideally would be equal to $U_n$, $U_{n1}$ will typically be above $U_n$ by a small amount to account for impedances and inefficiencies in the system. $U_n$ represents the specified nominal voltage at no load (e.g., 750 V). $U_{min1}$ represents the lowest permanent voltage (e.g., 500 V). On the right side of the chart, one or more loads (i.e., vehicles 10) are drawing power from the power line 12 which causes a voltage drop. In response, the substation 26 supplies power to the power line 12. On the other hand, on the left side of the chart, the voltage is above the nominal voltage $U_n$ (and $U_{n1}$) and the substation 26 quits supplying power to the power line 12. This may be caused by one or more vehicles 10 operating in the generation mode during a braking event and supplying the produced electricity to the power line 12 in an energy recuperation mode. It is noted that in the preferred embodiment, the substation 26 is a unidirectional source of electric power, in that the substation provides electric power to the power line 12 as needed but cannot absorb excess power from the power line 12.

Turning to FIGS. 3-7, various possible operating states are shown. In FIG. 3, two vehicles 10 are connected to the power line 12 but are both operating in standby mode, meaning that the vehicles 10 are not drawing power from the power line 12 or supplying power to the power line 12. This may occur when the vehicles 10 are standing still or coasting, etc. As shown in the voltage chart for FIG. 3, the voltage on the power line 12 remains at Uni. Notably, the voltage is characterized by ripples (first ripples). This is caused by the diode rectifier 34 of the substation 26 which is supplying power to the power line 12 in this state. It is understood that the frequency of the ripples is higher than the frequency of the AC grid frequency supplying power to the substation 26. In particular, it is standard for the frequency of the ripples generated by the diode rectifier 34 to be 6 times or 12 times the AC grid frequency, which means the ripples will have a frequency of 360 Hz or 720 Hz where the grid frequency is 60 Hz.

Figure 4:
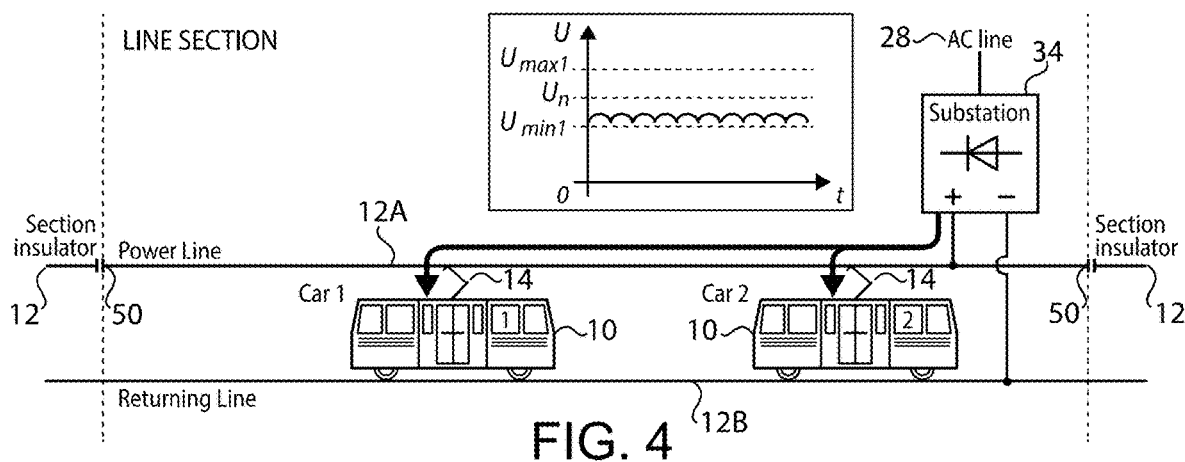
FIG. 4 is schematic of a power draw state of the power line system.

In FIG. 4, the two vehicles 10 are both drawing power from the power line 12. This may occur, for example, when the vehicles 10 are accelerating. In this case, the voltage on the power line 12 drops, and the diode rectifier 34 supplies power to the power line 12. Thus, as shown, the ripples generated by the diode rectifier 34 are still present.

Figure 5:
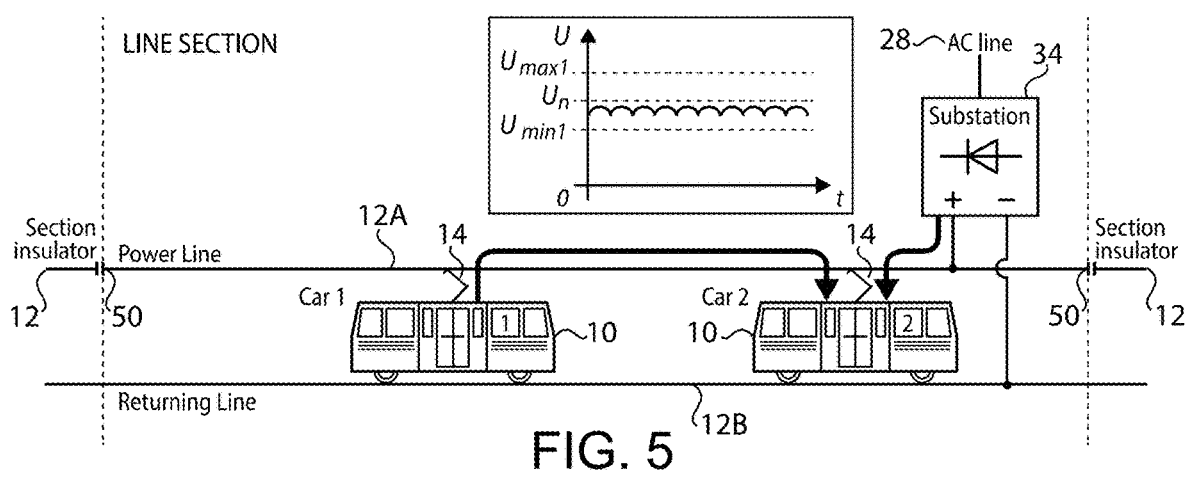
FIG. 5 is schematic of a power sharing state of the power line system.

In FIG. 5, the vehicle 10 on the left is in a generation mode where the vehicle 10 is producing electricity (e.g., braking). In contrast, the vehicle 10 on the right is drawing power from the power line 12 (e.g., accelerating). Since the power required by the right vehicle 10 is more than the power that the left vehicle 10 can provide, the substation 26 supplies power to the power line 12 (and to the right vehicle 10) to make up the difference between the power provided by the left vehicle 10 and the power required by the right vehicle 10. Notably, because the substation 26 is providing some power to the power line 12 in this state, the ripples are present on the power line 12. As further explained below, the power line detector 20 on the left vehicle 10 senses the ripples and because the ripples are present, the controller 16 uses the energy recuperation mode to provide the produced electricity to the power line 12.

Figure 6:
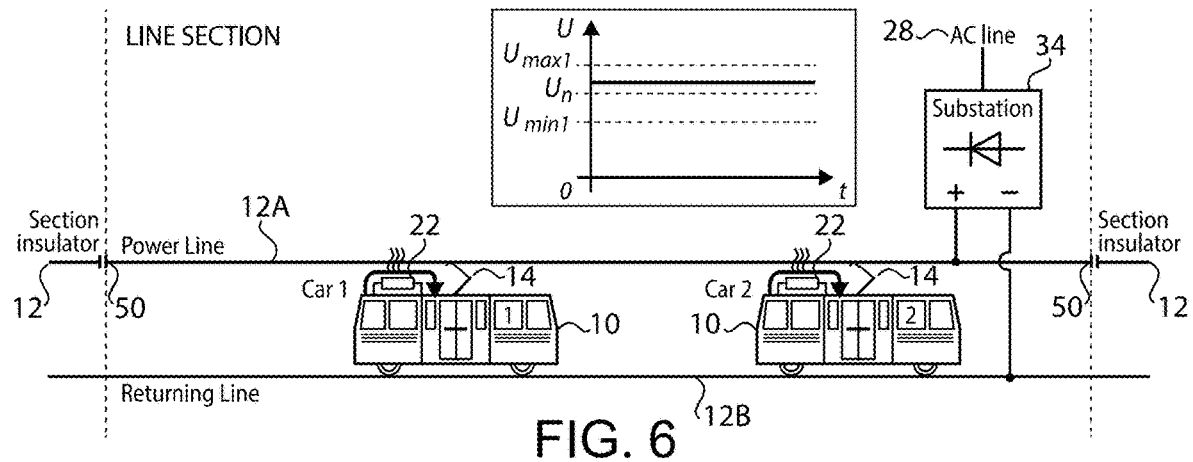
FIG. 6 is schematic of a generation mode of the power line system with energy being dissipated by the vehicles.

In FIG. 6, both vehicles 10 are operating in the generation mode (e.g., both vehicles 10 are braking). As a result, the voltage on the power line 12 may exceed $U_n$. Because the voltage is above $U_n$, the substation 26 stops supplying power to the power line 12. As a result, the diode rectifier 34 is no longer operating to supply power, and therefore, there are no ripples on the power line 12. This could create a potentially unsafe condition if the vehicles 10 were allowed to supply all of their produced electricity to the power line 12 and if the voltage on the power line 12 were allowed to exceed $U_{max2}$. Because of this, the controllers 16 on the vehicles 10 only operate in the energy recuperation mode (i.e., supplying energy to the power line 12) when the power line detectors 20 sense ripples on the power line 12. Thus, in FIG. 6, the vehicles 10 may initially operate in the energy recuperation mode when a braking event begins, but this extra energy recuperation supplied to the power line 12 will quickly boost the voltage on the power line 12 above $U_n$. As a result, the substation 26 stops supplying power and the ripples are no longer present. Then, because the power line detectors 20 do not sense any ripples, the controllers 16 stop operating in the energy recuperation mode (even though the vehicles 10 are operating in the generation mode). This means that the excess electrical energy produced by the vehicles 10 must be dissipated onboard each vehicle 10, which is done by the rheostats 22. However, in this situation, the electrical energy produced by the vehicles 10 is inefficiently wasted.

Figure 7:
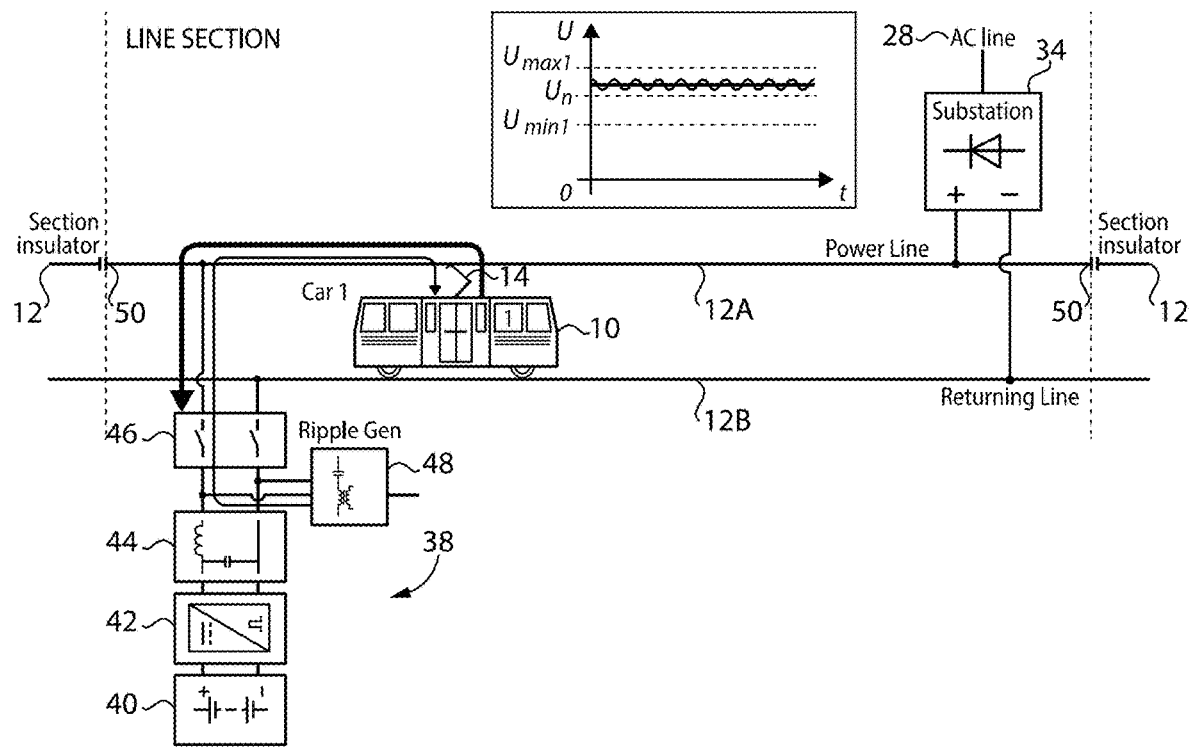
FIG. 7 is schematic of an energy recuperation state of the power line system with energy being absorbed by an energy storage system.

In FIG. 7, the power line system is shown in conjunction with the energy storage system 38. In this case, the vehicle 10 is operating in the generation mode due to a braking event. As a result, the voltage on the power line 12 is boosted above $U_n$, which stops the substation 26 from supplying power and ordinarily would stop any ripples from being present on the power line 12. However, because a separate ripple generator 48 is provided, ripples (second ripples) may still be generated on the power line 12. Since the power line detector 20 on the vehicle 10 senses ripples on the power line 12, the controller 16 operates in the energy recuperation mode by providing excess produced electrical energy to the power line 12. This excess energy is then absorbed by the energy storage system 38 to charge the energy storage 40. Thus, energy produced by a vehicle 10 during a generation mode may be efficiently stored even when the voltage on the power line 12 is above $U_n$.

The ripple generator 48 may be controlled in various ways. For example, it may be desirable to deactivate the ripple generator 48 when the battery 40 is at full capacity. Thus, the ripple generator 48 may only generate ripples when the energy storage system 38 is below the maximum capacity. The ripple generator 48 may also be deactivated when the voltage on the power line 12 is above $U_{max1}$. Thus, the ripple generator 48 may not generate ripples when the voltage is above a maximum. It may also be desirable to deactivate the ripple generator 48 when the voltage on the power line 12 is below $U_n$. Thus, the ripple generator 48 may only generate ripples when the voltage is above a threshold. For example, it is possible for the ripple generator 48 to be only activated within a range of voltages on the power line 12, e.g., between $U_n$ and $U_{max1}$.

The power line detectors 20 on the vehicles 10 are preferably designed to sense voltage ripples of particular frequencies of at least a minimum amplitude. In particular, the detectors 20 preferably sense ripple frequencies greater than the grid frequency, and most preferably, 6 or 12 times the grid frequency. Thus, it is preferred that the ripples generated by the diode rectifier 34 and the ripple generator 48 be at the same frequency which is the frequency sensed by the detector 20. Thus, it is preferable for the frequencies of the ripples of the diode rectifier 34 and the ripple generator 48 to both be greater than the grid frequency and to both be 6 or 12 times the grid frequency. As a result, the detector 20 does not need to distinguish between the ripples from the diode rectifier 34 and the ripple generator 48. Therefore, in the preferred embodiment, the vehicles 10 do not operate in the energy recuperation mode if the detectors 20 do not sense ripples from either the diode rectifier 34 or the ripple generator 48. That is, the vehicles 10 can only operate in the energy recuperation mode if the detectors 20 sense ripples from the diode rectifier 34 or the ripple generator 48 or from both. Although the power line system may be controlled so that ripples are only generated from the diode rectifier 34 and the ripple generator 48 at different times to prevent overlapping of the ripples (e.g., with the diode rectifier 34 and ripple generator 48 being controlled by mutually exclusive power line voltages or by communication between the substation 26 and the energy storage system 38), it is also possible for the power line system to allow ripples from the diode rectifier 34 and the ripple generator 48 to be generated and present on the power line 12 at the same time. In such a case, the ripples of the diode rectifier 34 and the ripple generator 48 may amplify each other above the minimum ripple amplitude sensed by the power line detectors 20. Thus, the detectors 20 may not distinguish whether the sensed ripples are from the diode rectifier 34, ripple generator 48 or both.

Figure 8:
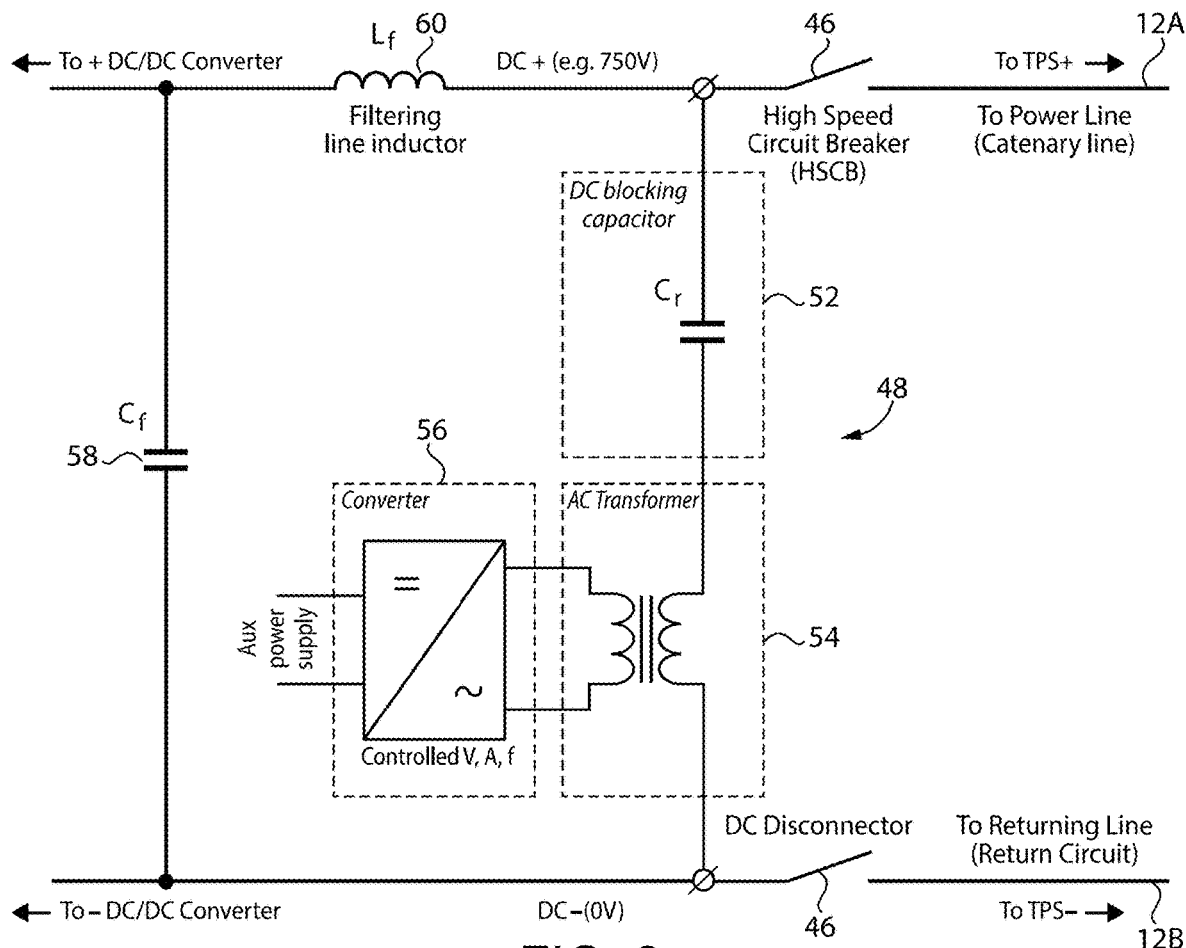
FIG. 8 is schematic of a ripple generator.

An example of the ripple generator 48 is shown in FIG. 8. As shown, the ripple generator 48 may have a resonant capacitor 52 and an AC transformer 54 in series between the DC positive line 12A and the DC negative line 12B of the power line 12. The resonant capacitor 52 may perform two functions. First, the resonant capacitor 52 may block the DC current flow through the AC transformer 54, which is potentially dangerous for the AC transformer 54. Second, the resonant capacitor 52 may tune the resonant circuit. Thus, the resonant capacitor 52 may have a capacitance that is selected to tune the frequency of the resonant circuit (i.e., filter inductor 60, filter capacitor 58, the AC transformer 54 and the resonant capacitor 52) close to the frequency of the desired ripples provided to the power line 12. The AC transformer 54 may also be useful to provide galvanic separation for safety and simplification of the DC/AC power converter 56. A power converter 56 which generates an AC frequency may be connected to the AC transformer 54. The power converter 56 preferably generates an AC voltage with a frequency and magnitude that emulates the ripples generated by the diode rectifier 34 of the substation 26. The power converter 56 may be supplied with power from a DC power source (e.g., an auxiliary DC power supply or the battery 40), in which case the converter may be a DC to AC converter 56, or the power may be provided from the AC grid 28, in which case the power converter 56 may be an AC to AC frequency converter. Although the transformer 54 may be desirable, it may be possible to omit the transformer 54 and connect the resonant capacitor 52 and power converter 56 directly in series between the positive 12A and negative 12B lines. A filter capacitor 58 (e.g., from the filter 44) may also be connected between the DC positive line 12A and the DC negative line 12B of the power line 12 in parallel with the resonant capacitor 52. A filter inductor 60 (e.g., from the filter 44) may also be connected on the DC positive line 12A between the filter capacitor 58 and the resonant capacitor 52.

Figure 9:
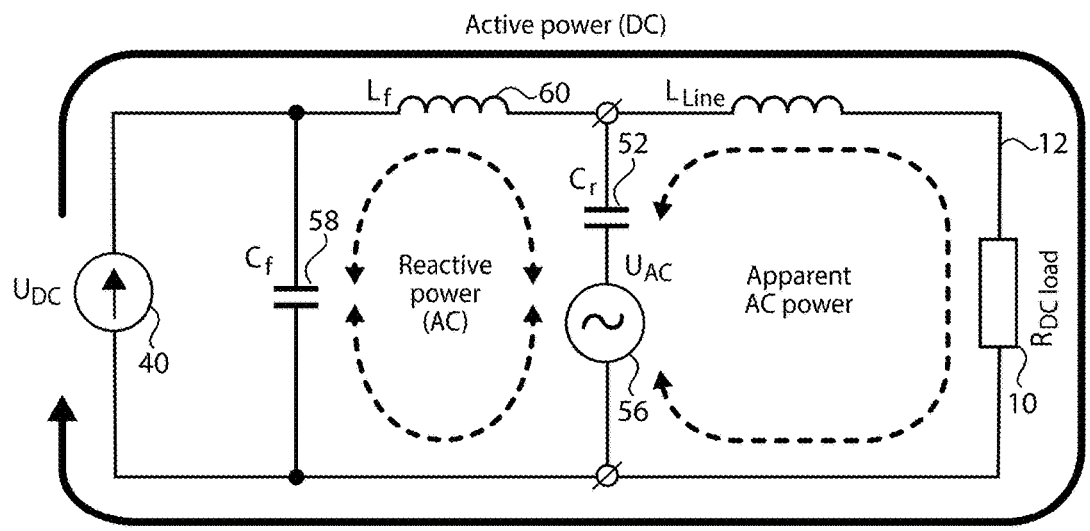
FIG. 9 is a simplified schematic of the energy storage system and the ripple generator.

FIG. 9 illustrates a simplified electric circuit for the energy storage system 38 and the ripple generator 48. In the schematic, $U_{DC}$ represents the mean voltage of a DC/DC converter (e.g., a battery 40). Power can be supplied by or absorbed by the $U_{DC}$ power source 40. Typically, the $U_{DC}$ power source 40 will utilize a PWM square wave voltage which necessitates the use of a filter inductor 60 and filter capacitor 58. $U_{AC}$ represents the voltage of the AC transformer 54 and power converter 56. $U_{AC}$ power source 56 provides energy for the loop including the resonant capacitor 52, filter inductor 60 and filter capacitor 58. The loop may be a serial resonant circuit, where $w_{res}=1/\sqrt{(L_f+L_{Tr})*((C_f*C_r)/(C_f+C_r))}$. The values of $L_f$ and $C_f$ are preferably defined by the DC/DC converter 40 filtering requirements. The value of $L_{Tr}$ is preferably the transformer 54 leakage inductance which is typically much smaller than $L_f$ (and could be neglected). The resonant frequency of the loop (i.e., $C_r$, $L_f$, $C_f$, $U_{AC}$) may be set to a value close to desired ripples (e.g., 6×60 Hz). The loop may also be tuned by the selection of the capacitance of the resonant capacitor 52. It is also preferable for the capacitance of the resonant capacitor 52 to be much less than the capacitance of the filter capacitor 58. The resonant circuit gathers and keeps energy in reactive components (i.e., the inductor 60 and capacitors 52, 58) that oscillates in the loop. In the present example of the loop, parasitic resistances of the components and connections may be neglected.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A power line system for one or more electric vehicles, comprising:
 a power line extending along a travel length;
 the electric vehicles being connected to the power line such that the electric vehicles are adapted to draw power from the power line while traveling along the travel length, the electric vehicles being alternatively operable in an energy recuperation mode to supply power to power line;
 a substation connected to the power line and supplying power to the power line, the power supplied to the power line by the substation being characterized by first ripples;
 an energy storage system connected to the power line and receiving power from the power line;
 a ripple generator connected to the power line and generating second ripples on the power line; and
 each of the electric vehicles comprising a power line detector sensing the first and second ripples, wherein the electric vehicles do not operate in the energy recuperation mode if the power line detector does not sense either the first ripples or the second ripples, the electric vehicles being operable in the energy recuperation mode if the power line detector senses the first and/or second ripples.

2. The power line system according to claim 1, wherein the substation only supplies the power with the first ripples to the power line when a voltage of the power line is below a nominal voltage.

3. The power line system according to claim 1, wherein the first ripples are generated by a diode rectifier converting AC power from a power grid to DC power for the power line.

4. The power line system according to claim 1, wherein each of the electric vehicles comprises an electric energy dissipater, the electric energy dissipater absorbing electric energy from the electric vehicle while the electric vehicle is operating in a generation mode producing electric energy but not in the energy recuperation mode supplying power to the power line.

5. The power line system according to claim 1, wherein the ripple generator is connected between an energy storage in the energy storage system and the power line.

6. The power line system according to claim 1, wherein the ripple generator only generates the second ripples when the energy storage system is at a capacity less than maximum.

7. The power line system according to claim 1, wherein the ripple generator only generates the second ripples when a voltage of the power line is above a threshold voltage.

8. The power line system according to claim 1, wherein the ripple generator does not generate the second ripples when a voltage of the power line is above a maximum voltage of the power line.

9. The power line system according to claim 1, wherein the power supplied to the power line by the electric vehicles in the energy recuperation mode is absorbed by the energy storage system to charge the energy storage system while the second ripples are generated on the power line.

10. The power line system according to claim 1, wherein the power supplied to the power line by one of the electric vehicles in the energy recuperation mode is absorbed by another of the electric vehicles while the first ripples are supplied to the power line.

11. The power line system according to claim 1, wherein the travel length is within a range of ½ km and 30 km.

12. The power line system according to claim 11, wherein the substation and the energy storage system are separated from each other by at least 30% of the travel length.

13. The power line system according to claim 1, wherein the first and second ripples have the same frequency.

14. The power line system according to claim 1, wherein the first and second ripples have a frequency greater than a grid frequency supplying power to the substation.

15. The power line system according to claim 1, wherein the first and second ripples have a frequency of 6 times or 12 times a grid frequency supplying power to the substation.

16. The power line system according to claim 1, wherein the power line is a DC power line.

17. The power line system according to claim 1, wherein the ripple generator comprises a power converter generating an AC frequency.

18. The power line system according to claim 1, wherein the ripple generator comprises a resonant capacitor between a DC positive line of the power line and a DC negative line of the power line.

19. The power line system according to claim 1, wherein the ripple generator comprises a filter capacitor between a DC positive line of the power line and a DC negative line of the power line, a resonant capacitor between the DC positive line and the DC negative line in parallel with the filter capacitor, and a filter inductor on the DC positive line between the filter capacitor and the resonant capacitor.

20. The power line system according to claim 1, wherein the power line detector senses a minimum ripple amplitude, and the first and second ripples amplify each other above the minimum ripple amplitude when the first and second ripples are on the power line at the same time.

* * * * *